United States Patent [19]
Petrick et al.

[11] Patent Number: 6,039,573
[45] Date of Patent: Mar. 21, 2000

[54] PORTABLE APPARATUS FOR SIMULATING ULTRASONIC EXAMINATIONS

[75] Inventors: Jörg Petrick, Berlin; Michael Stähle, Falkensee, both of Germany

[73] Assignee: Schering Aktiengesellschaft, Berlin, Germany

[21] Appl. No.: 09/091,500

[22] PCT Filed: Dec. 19, 1996

[86] PCT No.: PCT/EP96/05855
§ 371 Date: Jun. 19, 1998
§ 102(e) Date: Jun. 19, 1998

[87] PCT Pub. No.: WO97/23855
PCT Pub. Date: Jul. 3, 1997

[30] Foreign Application Priority Data

Dec. 21, 1995 [DE] Germany ............ 195 49 240

[51] Int. Cl.⁷ .................................................. G09B 23/28
[52] U.S. Cl. .......................................... 434/268; 434/262
[58] Field of Search ............................ 434/262, 267, 434/268, 272, 295; 600/334, 336, 500

[56] References Cited

U.S. PATENT DOCUMENTS 4,894,013 1/1990 Smith et al. .
5,052,934 10/1991 Carey et al. .

OTHER PUBLICATIONS

Hein et al., IEEE Transactions on Biomedical Engineering, vol. 39, Issue 11 (Nov. 1992).

Hall et al., Medical Physics, vol. 22, Issue 7 (July 1995).

Routh et al., Medical Progress Through Technology, vol. 15, Issue 3/04 Jan. 1989).

Hall et al., Proceedings of the Annual International Conference of the Engineering in Medicine and Biology Society, Orlando, Oct. 31–Nov. 3, 1991, vol. 13, pp. 169–170.

Berrios et al., Ultrasonic Imaging, vol. 16, Issue 2 (April 1994).

*Primary Examiner*—Sam Rimell
*Attorney, Agent, or Firm*—Millen, White, Zelano & Branigan

[57] ABSTRACT

A portable flow model for simulating ultrasound studies contains an injection point, a pump, a choke, a valve, a study chamber equipped with a study window and another choke that is used as resistance. These individual components are connected to one another in a closed circuit by a tube system.

13 Claims, 3 Drawing Sheets

PORTABLE APPARATUS FOR SIMULATING ULTRASONIC EXAMINATIONS

BACKGROUND OF THE INVENTION

1. Field of the Invention

The invention relates to the subject that is characterized in the claims, i.e., a portable flow model for simulating ultrasound studies, especially for simulating contrast medium-supported studies.

2. Background Art

As early as the late 1900s, teaching models for practical imparting of a wide variety of diagnostic and therapeutic methods in medicine were produced and marketed. Specifically in the area of diagnosis, such demonstration and practice models still provide valuable support in learning various study techniques.

Sonography represents a valuable aid in studies of the vascular system. For the study of liquid-filled spaces, such as cardiac vessels or blood vessels, however, in sonographic studies in the B-image it is necessary that an echogeneic substance, whose scatter coefficient is significantly higher than that of the blood plasma, be added to the system. Since the scatter coefficients of gases in liquids are especially large, suspensions that contain fine gas bubbles are known as very effective ultrasonic contrast media.

The use of such contrast media offers, however, not only advantages in the B-image but also in color Doppler or spectral Doppler when working under adverse acoustic irradiation conditions.

Since ultrasonic contrast media have been available on the market only for a short time—the first approved ultrasonic contrast medium was actually introduced on the market only in 1991 (Echovist(®); Schering AG)—awareness of the advantages that are gained when using ultrasonic contrast media is still slight. There is a requirement to provide a device that

- makes the physician familiar with the application of these new methods and the resultant new expanded diagnostic possibilities,
- shows the advantages of contrast medium-supported sonography,
- makes transparent the physical effects that are used,
- makes possible comparisons between various contrast media under standardized conditions.

In the publication by Ilmar A. HEIN et al. (1992) IEEE Transactions on Biochemical Engineering Vol. 39, pp. 1111, a flow model for simulating ultrasound studies is described. In this case, predetermined flow rates of venous and arterial blood vessels are simulated. The latter is achieved by simulating a constant flow or a pulsating flow. The flow model has two pump systems, a peristaltic pump for continuous flow and a reciprocating pump for intermittent flow. The various components of the model are connected together by a tube system that is made of polyester. It is partially immersed in a water bath to control the temperature and to keep it constant. The transducer is also located in a sheathed container in a water bath.

The peristaltic pump provides a constant flow, whereby liquid is pumped into a tall reservoir with an overflow device. Under the action of gravity, the liquid flows from the tall reservoir into a pulsation chamber. From there, the liquid moves into the transducer-equipped study area. If the reciprocating pump is shut down in the pulsating chamber, there is a laminar flow. If the reciprocating pump is active, an arterial flow is simulated. The frequency of the reciprocating stroke is controlled by a motor, which translates rotation into a linear movement using a gear.

The disadvantage is the complicated structure and the use of two pump systems. The reservoirs are also dependent on the flow model being positioned on a horizontal surface. The structure of the reservoirs keeps the flow model from being transported easily.

SUMMARY OF THE INVENTION

The object of this invention was therefore, if the above-mentioned point is observed, to provide a device for demonstrating ultrasonic contrast media, which each student's device or of being able to compare various contrast media with one another, can simulate pathological alterations of the vessels (such as, e.g., vascular constrictions by "plague" deposits), can simulate various penetration depths in the tissue.

This object is achieved by this invention.

It has been found that a portable flow model that contains an injection point (1), a pump (2), a valve unit that consists of a choke (3) and a valve (4), a study chamber (6) that is equipped with a study window (8) and a choke (9), whereby the individual components are connected together by a tube system, is extremely well suited for simulating contrast medium-supported ultrasound studies.

BRIEF DESCRIPTION OF THE DRAWINGS

The structure of the flow model is depicted diagrammatically in FIG. 1. The individual components are illustrated in their function below.

DETAILED DECSRIPTION

Figure 1:
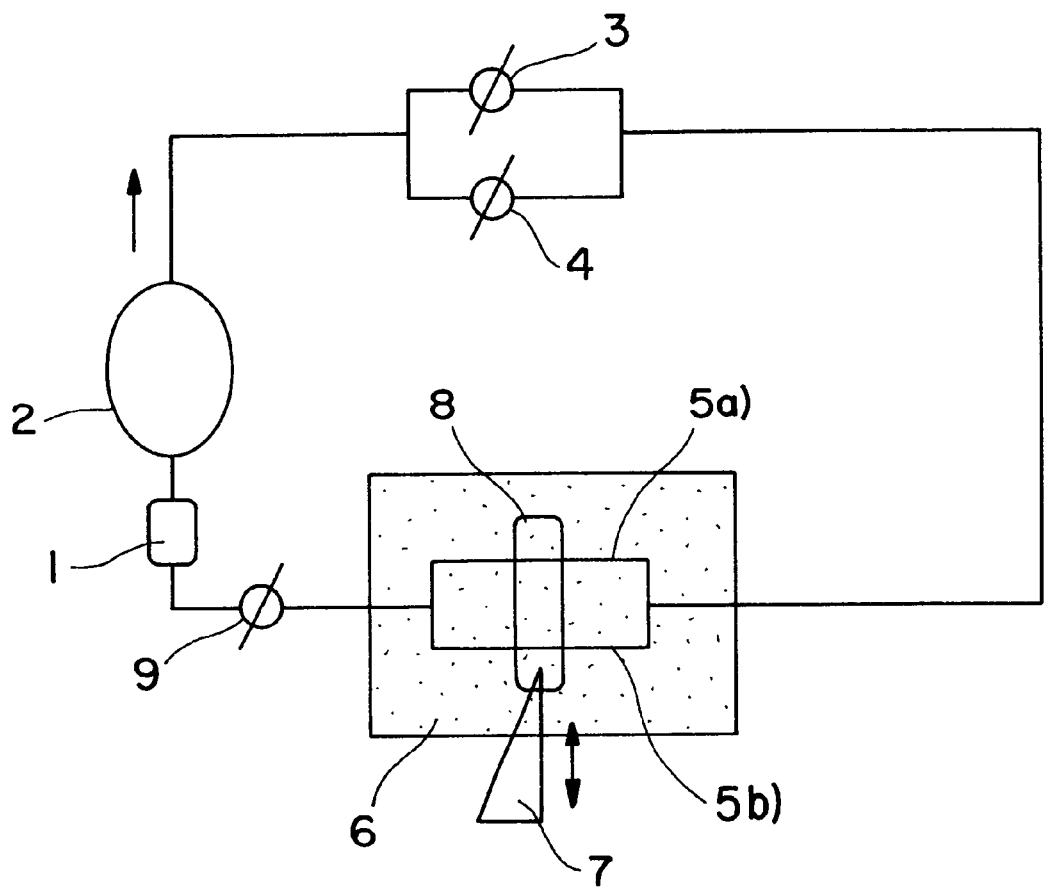

The flow circuit contains an injection point (1) via which optionally the contrast medium can be injected into the circuit. Suitable as materials are, e.g., rubber septa, as are also used extensively in storage bottles (vials) for liquid pharmaceutical agents.

From the injection point, the contrast medium or the medium that is contained in the circuit moves into a pump (2), which represents the heart. Suitable pumps are centrifugal pumps or diaphragm pumps, etc., with controllable pump output. Since such pumps have a constant delivery but here a pulsating stream (such as corresponds to the in vivo blood stream) is desired, it is necessary to influence the stream by a suitable device. This is done according to the invention by the pump flow being divided via a branching point into two tubes (branches) that are connected in parallel. Via one of the two branches, a constant flow is regulated via a choke (3), which basically corresponds to the diastolic rate of flow in the desired vessel to be studied. The other branch contains a clocked valve (4), which switches alternately to open or closed, whereby the switching clock (the switching frequency) corresponds to the natural pulse frequency. The two branches are then re-joined, whereby a pulsating flow behavior is achieved by the superposition of the two flows.

With this simple arrangement, which consists of a pump and valve unit [consisting of a choke (3) and a valve (4)], it is possible, surprisingly enough, to achieve a flow behavior that corresponds to physiologic conditions. Pressure fluctuations such as correspond to the in vivo pressure differences between systolic and diastolic pressure can thus be produced. Valve control can be done via a simple clock generator. An expensive electronic unit, such as would be necessary if, e.g., comparable flow conditions were achieved by varying pump rpm, can be avoided. The flow conditions also can be matched to the in vivo conditions, such as are present in different vessels, by this structure (via the type of timing and the measurement of the choking action).

Figure 3:
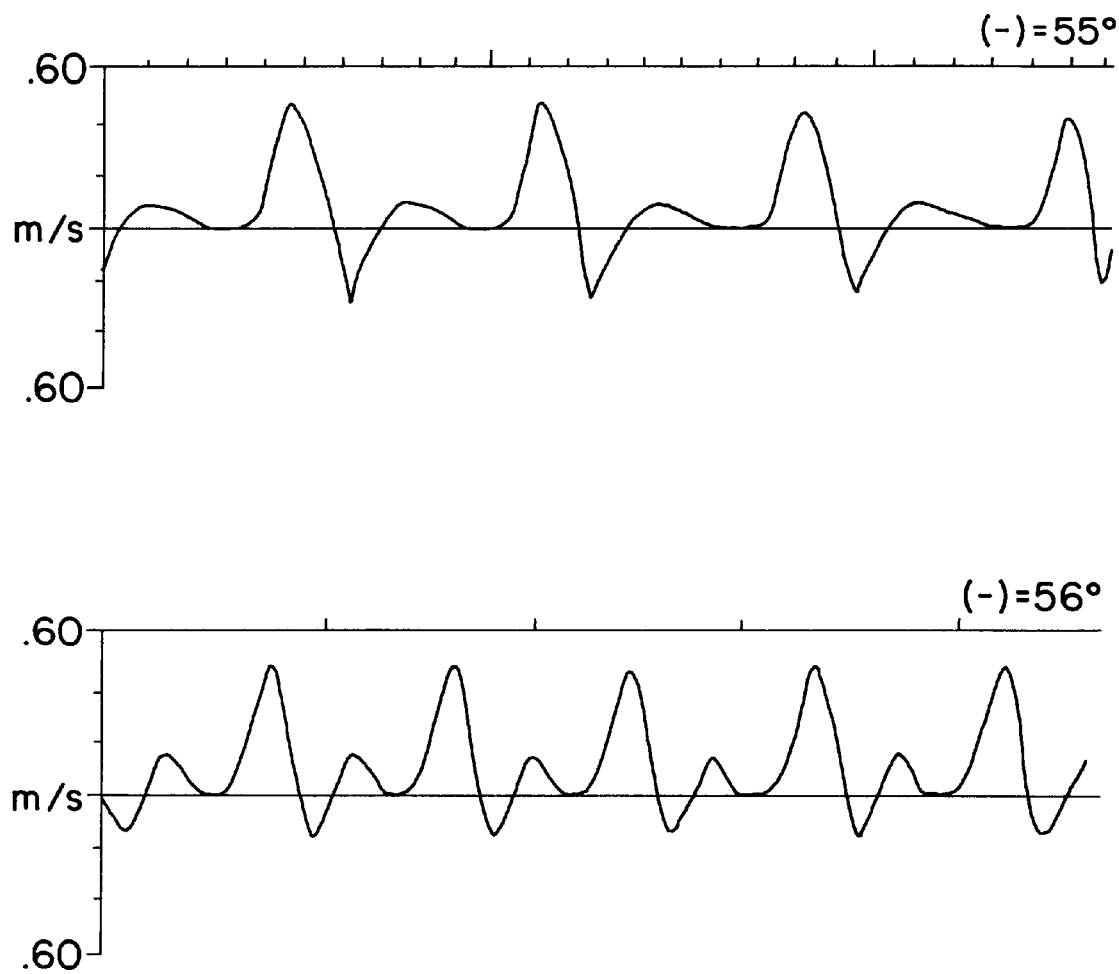
FIGS. 3 and 4 are illustrations of arterial flow conditions.
Figure 4:
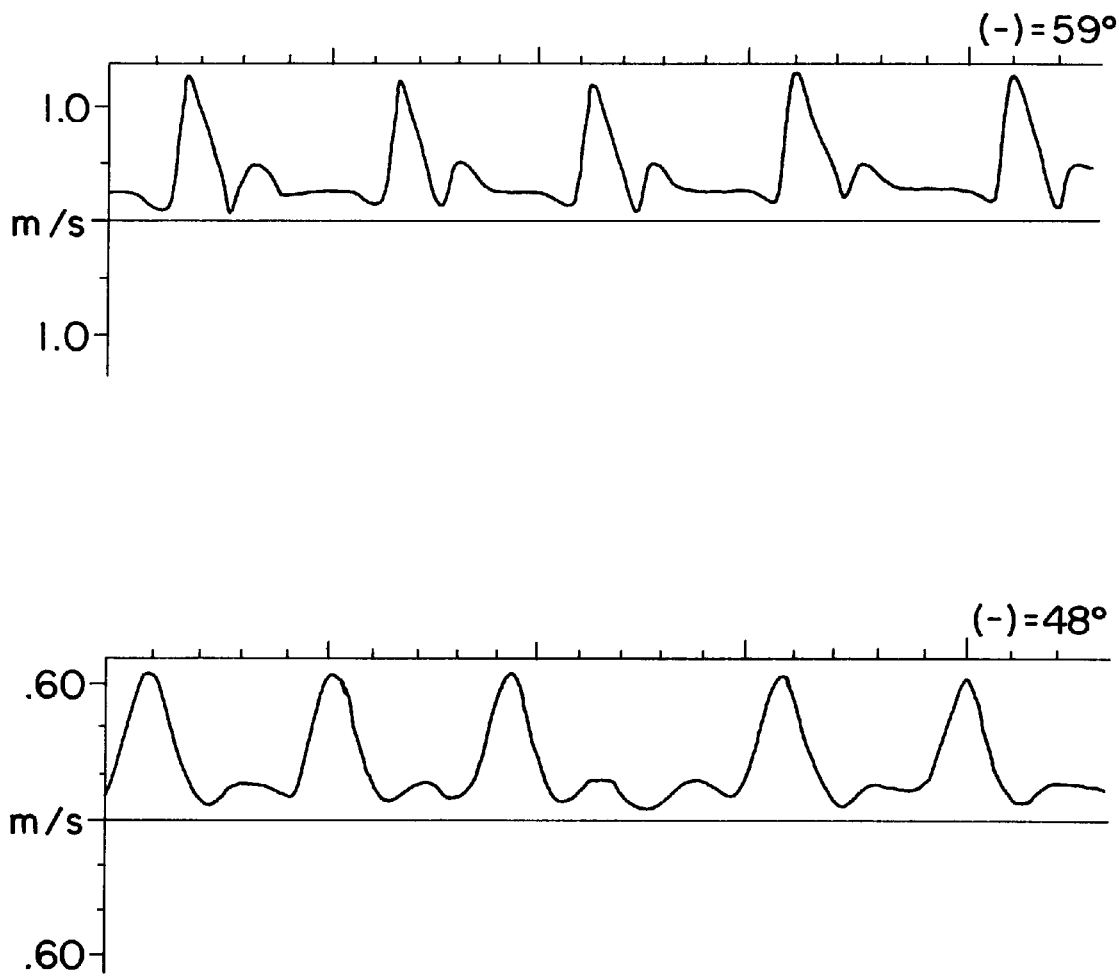

FIG. 3 shows the flow conditions in the arteria femoralis under in vivo conditions (top) and simulated in the flow model (bottom). FIG. 4 shows a comparison of the flow conditions in the arteria carotis (in vivo/top; in vitro/bottom). In both cases, a good match between the curve profiles in vivo and in vitro is observed.

The core part of the flow model is study chamber (6), which represents the body region that is to be studied and can be made from various materials. Advantageously, transparent materials, such as, e.g., plexiglass, are used to allow the user to look into the study space. Since the chamber is filled with a liquid medium, it must be made in a watertight type of design. As media, water or acoustic-attenuating fluids are suitable.

The chamber contains two tubes [5a) and 5b)] that are connected in parallel, through which a medium, which is used as a blood substitute, flows. The tubes represent the vessels that are to be studied and can be altered artificially, e.g., by attaching constrictions that simulate, e.g., a stenosis. In this case, one tube then contains the "pathological" alteration, while the other tube is used as a reference. The tubes are made from thin-walled material that has an acoustic impedance that corresponds to physiologic conditions. Various plastics, such as, for example, polypropylene or silicone, are suitable.

In addition, the chamber contains an elastic study window (8), which is used almost as a skin substitute and can be attached to the transducer of the respective ultrasonic device. The study window is placed on tubes (5) and is made from a material that is permeabl e to ultrasound (such as, e.g., silicone). This structure allows any ultrasonic devices "to connect" to the circuit, thus making it possible to teach the user on his own ultrasonic device the advantageous action of a contrast medium that is introduced into the circuit.

Figure 2:
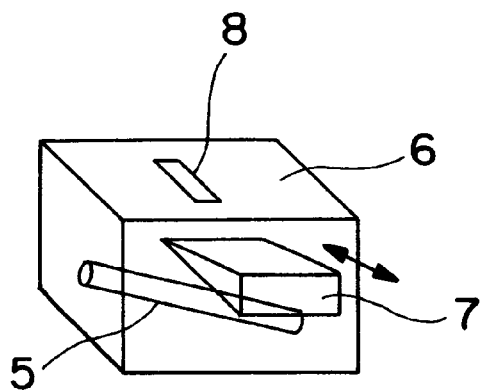
FIG. 2 shows study chamber (6) in a spatial representation and in side view.

Between the study window and tubes, a medium that ensures ultrasound damping that corresponds to that of bodily tissue can be introduced. The d amping medium can be, e.g., polyurethane rubber, which is pre-formed in a wedge shape. As a function of the insertion depth, this damping wedge (7) simulates a variety of tissue layer thicknesses. The wedge thus works in depth (in this respect, see also FIG. 2). This arrangement thus also allows for the simulation of deeper vessels, without the geometry of the arrangement having to be altered. This is advantageous because it allows a direct comparison of different studies under otherwise identical conditions (such as, e.g., irradiation and reflection angle).

Choke (9) is used as flow resistance that can be regulated, by which the flow rate can also be regulated. With the aid of the choke that can be regulated, the flow profiles can also be influenced to achieve even better matching to physiologic conditions. This choke thus is used basically to limit the upper limit of the pressure that prevails in the circuit to a value that corresponds to the systolic pressure.

The flow circuit is filled with a medium that is used as a blood substitute. Suitable are liquid media that have viscosities similar to that of blood, such as, e.g., water-glycerine mixtures, which can optionally contain additives, such as, e.g., silver salts for sterilization to prevent the formation of algae in the circuit. Individual components, such as, e.g., cellulose fibers or latex particles, can also be added to the fluid to simulate flow properties, such as correspond to that of blood. If other comparable liquids are used, care must be taken to ensure that the liquid that is used, in addition to viscosity, is also very close to blood plasma in terms of its solution properties compared to the contrast medium used and in terms of its acoustic properties. The circuit can be filled or emptied via a filler neck (not shown in FIG. 1), which can be located at any point in the circuit. This allows easy cleaning, which is necessary, e.g., after many contrast medium injections. The water also can be drained before the device is transported in order to avoid increasing the weight of the model unnecessarily.

Chamber (6), which can also be emptied before transport, is also equipped with a separate filler neck.

In a preferred embodiment, the model is housed in a portable case, e.g., in an attache case. The unit (pump and valves) can be powered either from the power mains or from a battery.

The model according to the invention makes it possible for the user to carry out a sonography study realistically. Its compact and light type of construction allows it to be used in a wide variety of "workshops" and "in-house" training. As a result, it is possible to show the future user of contrast media the advantages of these media as he is actually using his own ultrasonic scanner. The simple type of design allows almost maintenance-free use.

By way of example, an embodiment of the invention is illustrated based on the diagrammatic view of the circuit model (FIGS. 1+2).

Here:

| | | |
|---|---|---|
| 1) | means | injection point |
| 2) | means | pump |
| 3) | means | choke |
| 4) | means | valve |
| 5a) and b) | mean | ultrasound-conductive tubes |
| 6) | means | study chamber |
| 7) | means | damping wedge |
| 8) | means | study window |
| 9) | means | choke (resistance) |

We claim:

1. A portable flow model for simulating ultrasound studies, comprising individual components including an injection point (1), a pump (2), a choke (3) to which a clocked valve (4) is connected in parallel, a study chamber (6) that is equipped with a study window (8), and another choke (9), whereby the individual components are connected together by a tube system in a closed circuit.

2. Portable flow model according to claim 1, wherein a constant flow rate is regulated by choke (3) and valve (4) is switched in pulse frequency between open and closed.

3. Portable flow model according to claim 1, wherein study chamber (6) contains at least two tubes (5) that are connected in parallel and that are made of an ultrasound-conductive material.

4. Portable flow model according to claim 1, wherein one of tubes (5) contains a plastic constriction.

5. Portable flow model according to claim 1, wherein a variable acoustic attenuation can be introduced between tubes (5) and study window (8).

6. A portable flow model according to claim 5, wherein the variable acoustic attenuation is ensured by a movable damping wedge (7) representing a layer of tissue disposed in the study chamber (6), the moveable damping wedge (7) having a direction of motion selected so that the layer that is representedy the wedge (7) to be penetrated by ultrasound can be altered in thickness between study window (8) and tubes (5).

7. Portable flow model according to claim 6, wherein damping wedge (7) is made of polyurethane rubber.

8. A portable flow model according to claim 1, wherein the study chamber (6) is filled with water.

9. A portable flow model according to claim 1, wherein the flow circuit is filled with water.

10. A portable flow model according to claim 9, wherein the water includes additives selected from the group consisting of latex particles, cellulose fibers, and glycerine.

11. A portable flow model according to claim 8, wherein the water contains adjuvants.

12. A portable flow model according to claim 9, wherein the water includes sound scattering additives.

13. A portable flow model according to claim 9, wherein the water includes viscosity increasing additives.

* * * * *